United States Patent
Miyashita et al.

(10) Patent No.: US 6,758,989 B2
(45) Date of Patent: Jul. 6, 2004

(54) LIQUID-CRYSTALLINE POLYMER MOLDING

(75) Inventors: Takayuki Miyashita, Shizuoka (JP); Toshio Nakane, Shizuoka (JP)

(73) Assignee: Polyplastics Co. Ltd., Tokyo (JP)

(*) Notice: Subject to any disclaimer, the term of this patent is extended or adjusted under 35 U.S.C. 154(b) by 189 days.

(21) Appl. No.: 10/181,449

(22) PCT Filed: Jan. 24, 2001

(86) PCT No.: PCT/JP01/00448
§ 371 (c)(1),
(2), (4) Date: Jul. 18, 2002

(87) PCT Pub. No.: WO01/53416
PCT Pub. Date: Jul. 26, 2001

(65) Prior Publication Data
US 2003/0030031 A1 Feb. 13, 2003

(30) Foreign Application Priority Data
Jan. 24, 2000 (JP) ........................................ 2000-014951

(51) Int. Cl.⁷ .............................................. C09K 19/00
(52) U.S. Cl. .................. 252/299.01; 403/220; 285/223
(58) Field of Search .................. 252/299.01–299.7; 403/220; 285/223

(56) References Cited

U.S. PATENT DOCUMENTS

| | | | |
|---|---|---|---|
| 4,124,561 A | * | 11/1978 | Phipps, Jr. et al. |
| 4,888,127 A | | 12/1989 | Wada et al. |
| 5,229,451 A | * | 7/1993 | Carter et al. |
| 5,486,683 A | | 1/1996 | Shimizu et al. |
| 6,093,765 A | | 7/2000 | Cottis |

FOREIGN PATENT DOCUMENTS

| | | | |
|---|---|---|---|
| EP | 0 135 904 | * | 4/1985 |
| EP | 0 594 465 | * | 4/1994 |
| EP | 0 856 558 | * | 8/1998 |
| EP | 1 172 409 | * | 1/2002 |
| JP | 63-146958 | | 6/1988 |
| JP | 01-284547 | | 11/1989 |
| JP | 03-167252 | | 7/1991 |
| JP | 4-004592 | | 1/1992 |
| JP | 04-213354 | | 8/1992 |
| JP | 05-105808 | | 4/1993 |
| JP | 06-172619 | | 6/1994 |
| JP | 10-221566 | | 8/1998 |

OTHER PUBLICATIONS

Gallucci R: "Reducing Warp in Thermoplastics with Bilobe Glass Fibers" Plastics Engineering, Society of Plastics Engineers, Inc. Greenwich, Conn., U.S., vol. 49, No. 5, May 1, 1993, pp. 23 to 25, XP000368722, ISSN: 0091–9578.*

* cited by examiner

Primary Examiner—Mark F. Huff
Assistant Examiner—Jennifer R. Sadula
(74) Attorney, Agent, or Firm—Burns, Doane, Swecker & Mathis, L.L.P.

(57) ABSTRACT

The present invention is to provide a liquid crystal polymer molded article which has an excellent low warpage and is able to be suitably used particularly as a connector or the like. That is, a molded article of a liquid crystal composition in which 100 parts by weight of a liquid crystal polymer (A) and 5–100 parts by weight of a non-fibrous filler (B) are compounded where the non-fibrous filler is so dispersed that, when a diffraction peak of the non-fibrous filler is measured by a transmission method and a reflection method by means of a wide-angle X-ray diffraction, the diffraction peak of the non-fibrous filler which can be confirmed by the reflection method is not confirmed by the transmission method.

20 Claims, 5 Drawing Sheets

LIQUID-CRYSTALLINE POLYMER MOLDING

This is a national phase filing of International Application No. PCT/JP01/00448, filed Jan. 24, 2001.

TECHNICAL FIELD OF THE INVENTION

The present invention concerns a molded article using a liquid crystal polymer composition blended with a non-fibrous filler and, optionally, a fibrous filler. More in particular, it relates to a liquid crystal polymer composition of excellent less warping property which is particularly suitable for a connector and the like requiring low warp after molding and during reflow heating.

PRIOR ART

A liquid crystal polymer capable of forming an anisotropic molten phase has been known among thermoplastic resins, as a material excellent in dimensional accuracy and damping property and generating extremely little flash during molding. Heretofore, taking advantage of such features, liquid crystal polymer compositions reinforced with glass fibers have generally been adopted as SMT coping connectors. However, since connectors have been reduced in weight, thickness and size in recent years, existent molded articles using reinforcing materials only consisting of glass fibers cause a problem that they are deformed upon reflow to result in soldering failure with substrates due to insufficient rigidity because of the insufficient thickness, the anisotropy of glass fibers and internal stresses caused by pressure upon molding. Further, molded articles, using a reinforcing material only consisting of non-fibrous fillers or a composite filler reinforcing material comprising a non-fibrous filler and a glass fiber, can suppress deformation upon reflow but involves a problem of fracture upon fitting due to insufficient strength of the molded article per se. Thus, molded articles capable of overcoming all of the problems described above have not yet been present.

DISCLOSURE OF THE INVENTION

In view of the foregoing problems, the present inventors have made earnest research and study on materials having excellent characteristics regarding less warping property and mechanical properties and accomplished the invention based on the finding that the less warping property can be obtained without greatly deteriorating the mechanical properties by using a material in which a non-fibrous filler is blended in a specific amount into a liquid crystal polymer and molding the same so as to provide a particular oriented state.

That is, this invention provides a molded article of a liquid crystal polymer composition in which 100 parts by weight of a liquid crystal polymer (A) is blended with 5 to 100 parts by weight of a non-fibrous filler (B) in which a non-fibrous filler is so dispersed that when a diffraction peak of the non-fibrous filler is measured by a reflection method and a transmission method by means of a wide-angle X-ray diffraction, the diffraction peak of the non-fibrous filler that can be recognized by the reflection method can not be confirmed by the transmission method.

DETAILED DESCRIPTION OF THE INVENTION

The present invention is to be explained specifically. The liquid crystalline polymer (A) used in the invention means a melt processable polymer capable of forming an optically anisotropic molten phase. The property of the anisotropic molten phase can be recognized by an ordinary polarization inspection method utilizing crossed polarizers. More specifically, the anisotropic molten phase can be confirmed by using a Leitz polarization microscope and observing a molten specimen placed on a Leits hot stage at a 40× magnification ratio in a nitrogen atmosphere. The liquid crystal polymer applicable to this invention usually permeates a polarized light even in a molten stationary state to exhibit optical anisotropy when inspected between crossed polarizers.

The liquid crystal polymer (A) described above has no particular restriction but is preferably an aromatic polyester or an aromatic polyester amide and also includes those polyesters containing an aromatic polyester or aromatic polyester amide partially in one molecular chain. Those having a inherent viscosity (I. V.) of, preferably, at least about 2.0 dl/g and, further preferably, 2.0 to 10.0 dl/g when dissolved at a concentration of 0.1% by weight in pentafluorophenol at 60° C. are used.

The aromatic polyester or aromatic polyester amide as the liquid crystal polymer (A) employable to this invention is, particularly preferably, an aromatic polyester or aromatic polyester amide having, as the constituent, at least one compound selected from the group consisting of aromatic hydroxycarboxylic acids, aromatic hydroxyamines and aromatic diamines.

More specifically, they include, (1) polyester mainly comprising at least one of aromatic hydroxycarboxylic acids and derivatives thereof;
(2) a polyester mainly comprising (a) at least one of aromatic hydroxycarboxylic acids and derivatives thereof, (b) at least one of aromatic dicarboxylic acids, alicyclic dicarboxylic acids and derivatives thereof, (c) at least one of aromatic diols, alicyclic diols, aliphatic diols and derivatives thereof;
(3) polyester amides mainly comprising (a) at least one of aromatic hydroxycarboxylic acids and derivatives thereof, (b) at least one of aromatic hydroxyamine, aromatic diamine and derivatives thereof, and (c) at least one of aromatic dicarboxylic acids, alicyclic dicarboxylic acids and derivatives thereof; and
(4) polyester amide mainly comprising (a) at least one of aromatic hydroxycarboxylic acids and derivatives thereof, (b) at least one of aromatic hydroxyamines, aromatic diamines and derivatives thereof, (c) at least one of aromatic dicarboxylic acids, alicyclic dicarboxylic acids and derivatives thereof, and (d) at least one of aromatic diols, alicyclic diols, aliphatic diols and derivatives thereof. Further, a molecular weight controller may optionally be used together with the constituents described above.

Preferred examples of the specific compounds constituting the liquid crystal polymer (A) applicable to this invention can include aromatic hydroxycarboxylic acids such as p-hydroxybenzoic acid and 6-hydroxy-2-naphthoic acid, aromatic diols such as 2,6-dihydroxynaphthalene, 1,4-dihydroxynaphthalene, 4,4'-dihydroxybiphenyl, hydroquinone, resorcin and compounds represented by the following formulas (I) and (II); and aromatic dicarboxylic acids such as terephthalic acid, isophthalic acid, 4,4'-diphenyldicarboxylic acid, 2,6-naphthalene dicarboxylic acids and compounds represented by the following formula (III); and aromatic amines such as p-aminophenol, and p-phenylene diamine.

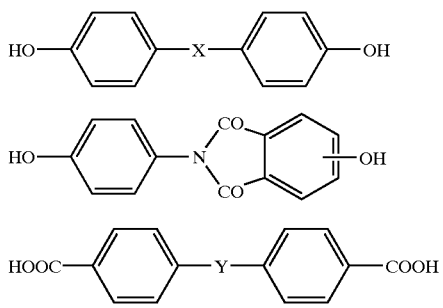

The particularly preferred liquid crystal polymer (A) applied to this invention is an aromatic polyester amide comprising-hydroxybenzoicacid, 6-hydroxy-2-naphthoicacid, terephthalic acid and p-aminophenol as the main constituent unit component.

For attaining the less warping property as an object of the invention, it is necessary that 5 to 100 part by weight of a non-fibrous filler (B) has to be dispersed based on 100 parts by weight of the liquid crystal polymer (A) so that when a diffraction peak of the non-fibrous filler is measured by a transmission method and a reflection method by means of a wide-angle X-ray diffraction, the diffraction peak of the non-fibrous filler confirmed by the reflection method is not confirmed by the transmission method. Even if the non-fibrous filler is used, when a molded article is measured by the reflection method and the transmission method by means of the wide-angle X-ray diffractiometry and the diffraction peak of the non-fibrous filler is confirmed also by the transmission method, the non-fibrous filler is not dispersed so as to exhibit the less warping property. For dispersing the non-fibrous filler so that the diffraction peak thereof is no more confirmed by the transmission method, the injection speed during molding is important. If the injection speed is too slow, the non-fibrous filler is not in such a dispersion state that the diffraction peak by the transmission method can not be confirmed. On the other hand, if it is too fast, since it forms an uneven layer by the resin jetting, the dispersion state is unfavorably worsened. Accordingly, the injection speed is preferably 100 to 400 m/sec, preferably, 150 to 300 mm/sec.

The non-fibrous filler (B) used in the invention is a spherical, indefinite, tetrapot-shaped or plate-shaped filler not having extension in one specified direction like fibrous fillers and, particularly, a plate-like filler such as of disk-like, square, rectangular or indefinite plate shape, particularly having extension in two directions and having no extension in the remaining one direction tend to be dispersed as described above and is used preferably.

Such a non-fibrous filler and a plate-like filler comprises materials, for example, talc, mica, kaolin, clay, graphite, vermiculite, silicates such as calcium silicate, aluminum silicate, feldspar powder, acidic white clay, agalmatolite clay, sericite, sillimanite, bentonite, slate powder and silane, carbonates such as calcium carbonate, chalk, barium carbonate, magnesium carbonate and dolomite, sulfates such as ballite powder, branc fixe, precipitation calcium sulfate, calcined gypsum, and barium sulfate, hydroxides such as alumina hydrate, oxides such as alumina, antimony oxide, magnesia, titanium oxide, zinc powder, silica, siliceous sand, quartz, white carbon and diatomaceous earth, sulfides such as molybdenum disulfide and metallic particles.

Among them, talc, mica, kaolin and graphite are preferred in view of the performance.

For attaining the less warping property, the more content of the non-fibrous filler, the better. But excessive addition worsens the extrudability and moldability, particularly, flowability and, further, lowers the mechanical strength.

Further, the less warping property can not be developed also when the addition amount is too small. Accordingly, the content of the non-fibrous filler (B) is from 5 to 100 parts by weight, preferably, 10 to 50 parts by weight based on 100 parts by weight of the liquid crystal polymer (A).

For improving the mechanical properties, a fibrous filler (C) with an average fiber diameter of 5 to 20 $\mu$m and an average aspect ratio of at least 15 may further be incorporated.

As the fibrous filler (C), glass fiber, carbon milled fiber, fibrous wollastonite, whisker, metallic fiber, inorganic fiber and mineral fiber can be used. For the carbon milled fiber, a PAN fiber using polyacrylonitrile as the raw material and a pitch fiber using pitch as the raw material is used.

As the whisker, silicon nitride whisker, silicon trinitride whisker, basic magnesium sulfate whisker, barium titanate whisker, silicon carbide whisker and boron whisker are used.

As the metallic fiber, fibers of soft steel, stainless steel, steel and alloys thereof, brass, aluminum and alloys thereof and lead are used.

As the inorganic fiber, various fibers of rock wool, zirconia, alumina silica, potassium titanate, barium titanate, titanium oxide, silicon carbide, alumina, silica and blast furnace slag are used.

As the mineral fiber, asbestos and the like are used.

Among them, glass fiber is preferred in view of the performance. As the glass fiber, ordinary glass fibers as well as glass fibers coated with metals such as nickel and copper, or silane fibers can be used.

Referring to the addition amount of the fibrous filler for improving the mechanical properties, the extrudability and the moldability, particularly, the flowability is worsened when the addition amount is large, whereas mechanical strength is lowered when the addition amount is small. Accordingly, the content of the fibrous filler (C) is 5 to 100 parts by weight, preferably, 10 to 50 parts by weight based on 100 parts by weight of the liquid crystal polymer (A).

In this case, the non-fibrous filler (B) serves to improve the less warping property but the excessive content thereof worsens the extrudability and moldability to make the material fragile. The fibrous filler (C) serves to improve the mechanical property but the excessive content thereof increases the deformation upon reflow. Accordingly, the total content of the components (B) and (C) has to be 150 parts by weight or less, preferably, 100 parts by weight or less based on 100 parts by weight of the liquid crystal polymer (A).

The non-fibrous filler and the fibrous filler used in the invention can be used as they are but a known surface treating agent and a known binder used generally may be used together.

Further, a composition provided with desired properties by the addition of additives such as nucleating agent, pigment such as carbon black, antioxidant, stabilizer, plasticizer, lubricant, mold releasing agent and flame retardant are also included within the scope of the liquid crystal polymer composition defined in the invention.

In the liquid crystal polymer molded article according to the present invention, when a liquid crystal polymer composition blended with at least one of non-fibrous fillers and, optionally, at least one of fibrous fillers are used, the non-fibrous filler is dispersed during molding to obtain a molded article of excellent less warping property without deteriorating the mechanical property and, further, higher performance can be provided in a state where each of the fillers is uniformly dispersed in the molded article with the non-fibrous filler being present between the fibrous fillers.

For producing such a liquid crystal polymer composition, both of them may be incorporated at the compositional ratio described above and extruded. Usually, they are extruded in an extruder into pellets and then used for injection molding but there is no restriction to the production by such extruders.

Further, the method of molding by using the liquid crystal polymer composition described above includes injection molding, extrusion molding or blow molding, with no particular restriction only to such methods.

EXAMPLES

Figure 1:
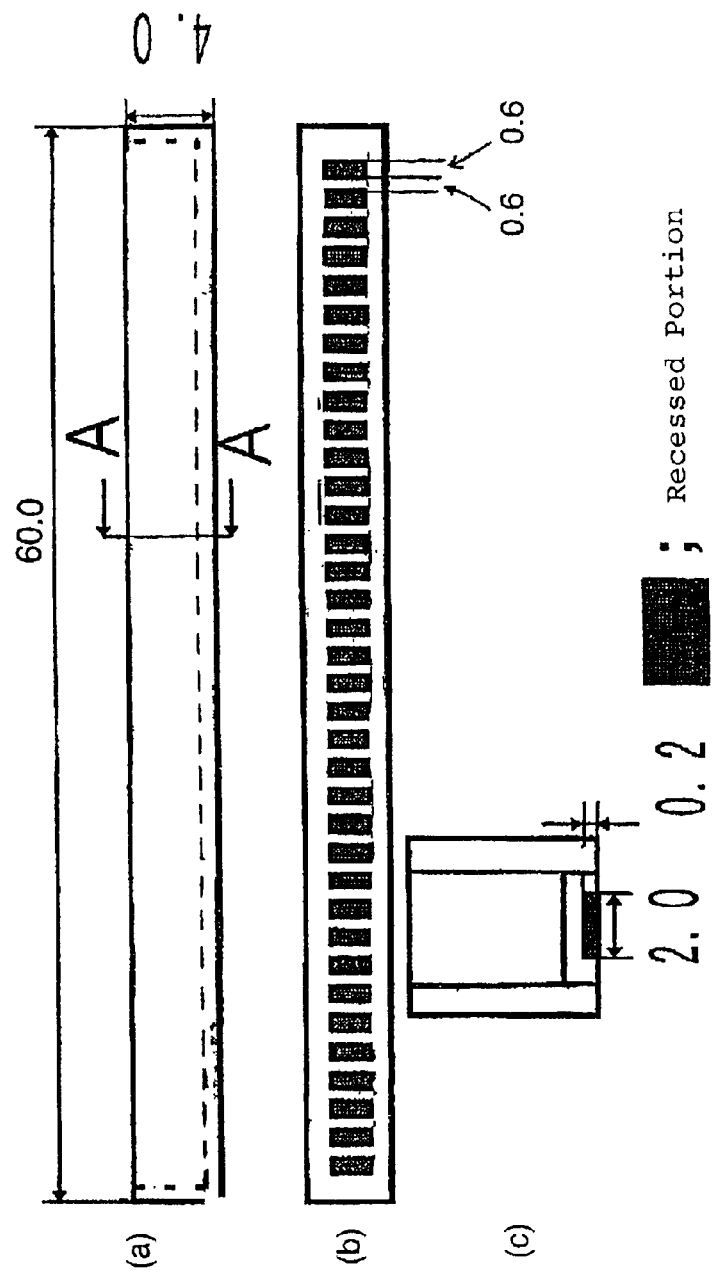
FIG. 1 is a drawing showing a shape of a connector type test piece used in the examples in which (a) is a front elevational view, (b) is a bottom view and (c) is a cross sectional view taken along line A—A in (A).
Figure 2:
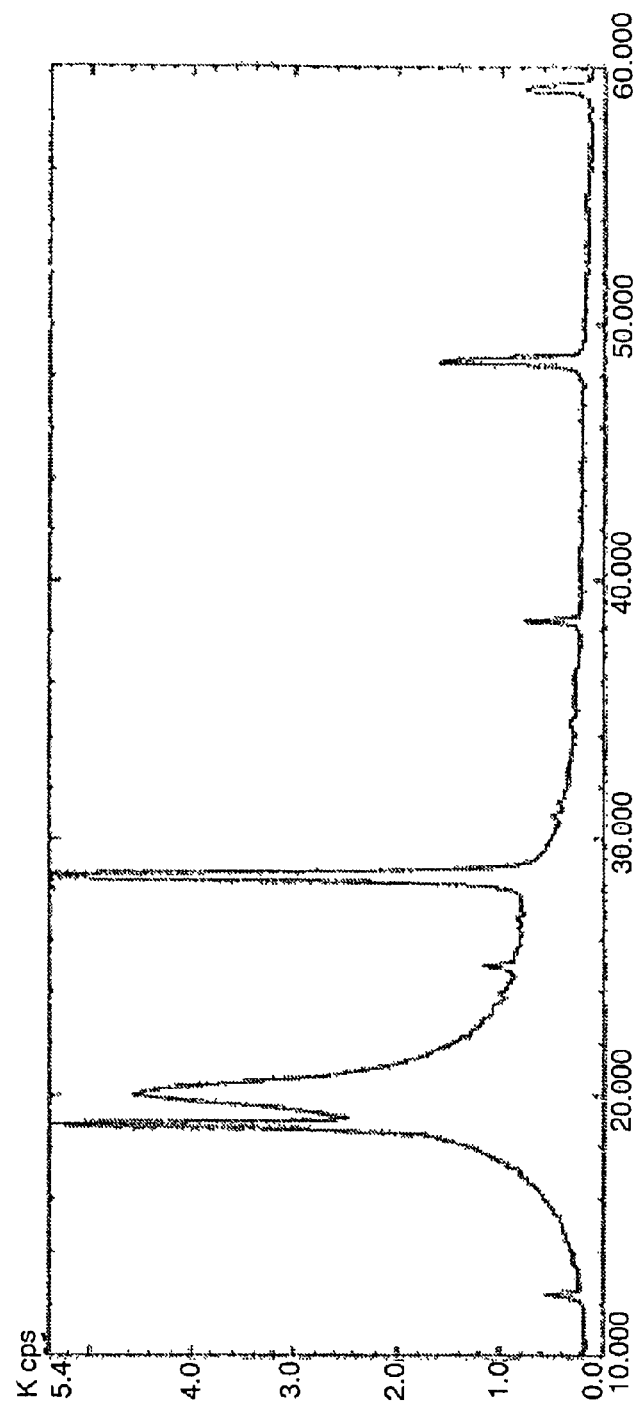
FIG. 2 is a measurement chart showing the result of measuring diffraction peaks of the non-fibrous filler by a reflection method by means of wide-angle X-ray diffractiometry in a molded article of Example 3.
Figure 3:
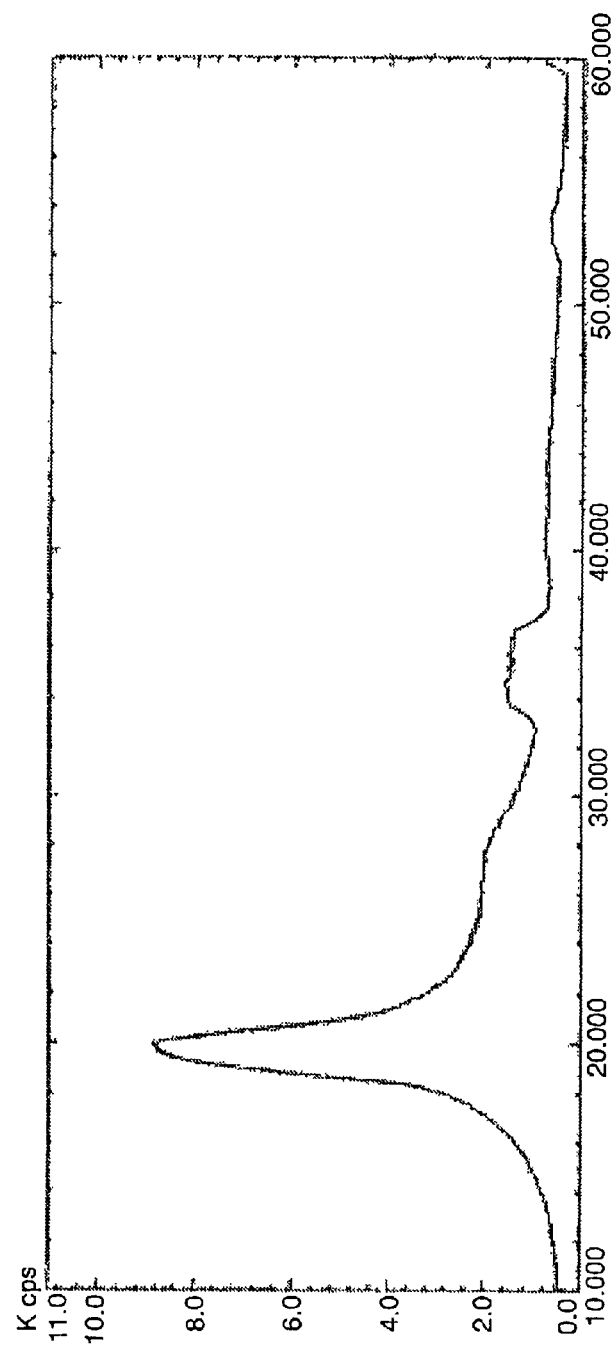
FIG. 3 is a measurement chart showing the result of measuring diffraction peaks of the non-fibrous filler by a transmission method by means of wide-angle X-ray diffractiometry in a molded article of Example 3.
Figure 4:
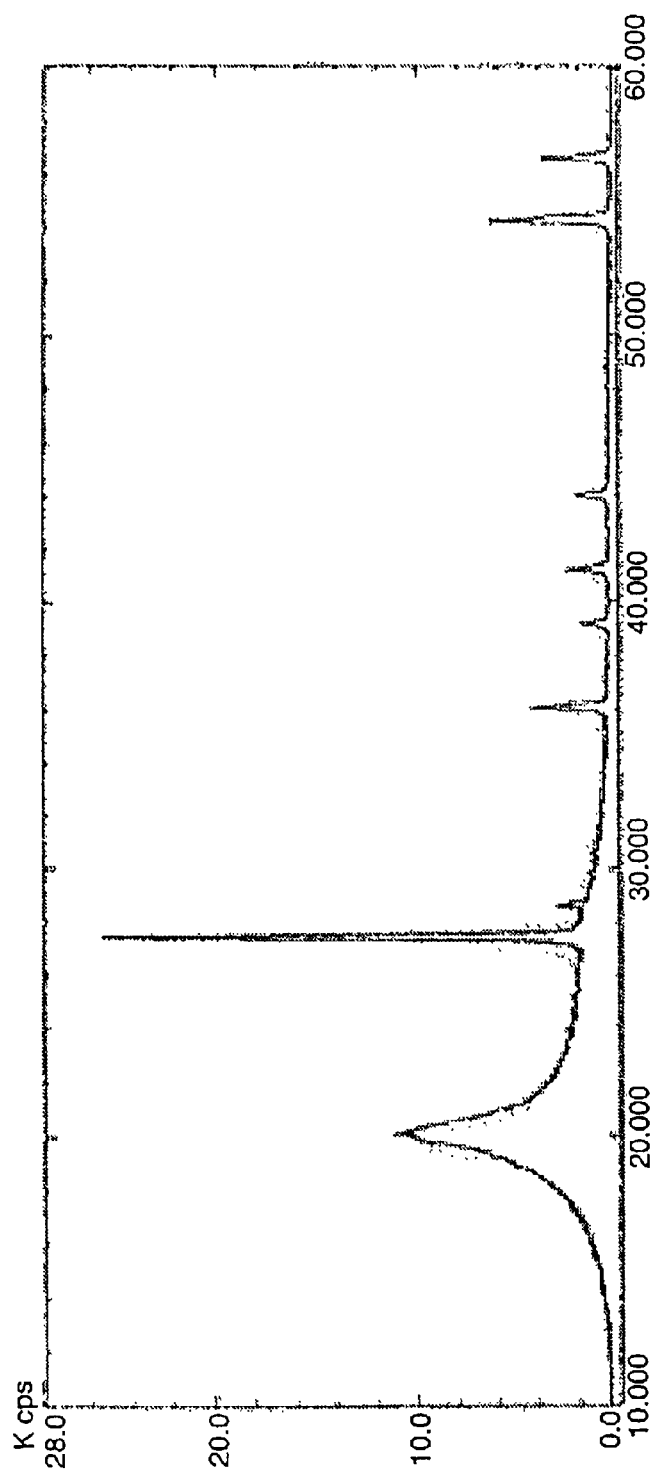
FIG. 4 is a measurement chart showing the result of measuring diffraction peaks of the non-fibrous filler by a reflection method by means of wide-angle X-ray diffractiometry in a molded article of Comparative Example 5.
Figure 5:
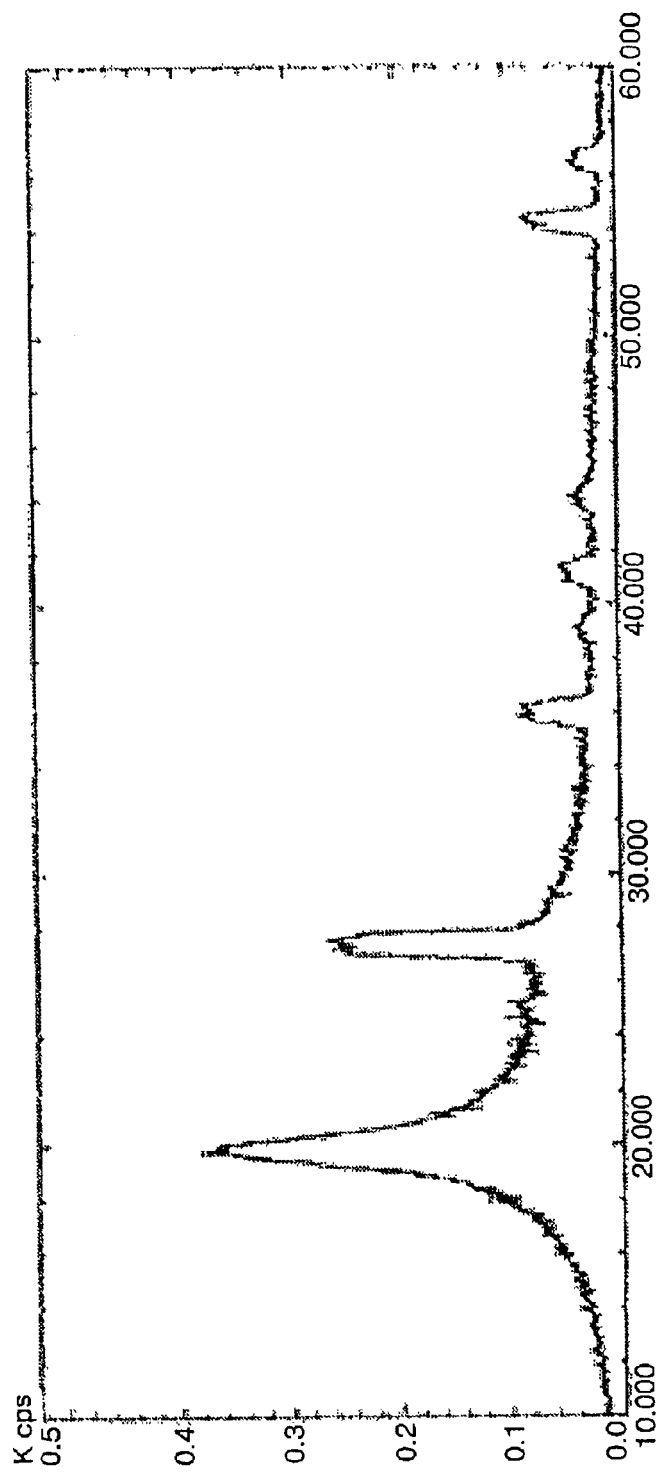
FIG. 5 is a measurement chart showing the result of measuring diffraction peaks of the non-fibrous filler by a transmission method by means of wide-angle X-ray diffractiometry in a molded article of Comparative Example 5.

The present invention is to be explained specifically by way of examples but it is not restricted to them. Measurement and examination of physical properties in the examples were conducted by the following method.
(1) Measurement of Plate Flatness
A flatplate of 60×60×0.7 mm was fixed at three points on a level plate (platen) and a height of a position where the flat plate was lifted most from the surface of the platen was measured to determine an average for three flat plates.
(2) Measurement of Warp of a Connector
In a connector type test piece with an inter terminal pitch of 0.6 mm, an average wall thickness (t) of the product of 0.3 mm, an external size of the product of 4 mm width×4 mm height×60 mm length and recessed as shown in FIG. 1, a distance between a line joining points on both ends of the connector fixing surface and a point at the central part was measured and average for ten connectors was determined.
(3) Measurement of Dispersion of the Non-fibrous Filler in a Molded Article
In a connector-shaped molded article, a portion to be measured was cut out and used for a wide-angle X-ray diffraction. The test piece was measured by the reflection method and the transmission method to confirm the absence or presence of the diffraction peaks of the non-fibrous filler. As typical examples, the measurement charts of Example 3 are shown in FIGS. 2 and 3 and the measurement charts of Comparative Example 5 are shown in FIGS. 4 and 5.

Examples 1 to 7 and Comparative Examples 1 to 6

To 100 parts by weight of a liquid crystal polyester (LCP: VECTRA E950i, manufactured by Polyplastics Co., Ltd.), each of the fillers shown in Table 1 was dry blended at a ratio shown in Table 1. The mixture was melt-extruded and pelletized by a twin-screw extruder (Model PCM-30, manufactured by Ikegai Tekko Co., Ltd.). When the test specimens were manufactured from the pellets by an injection molding machine at an injection speed shown in Table 1 and evaluated, the result shown in Table 1 was obtained. Each of the fillers used is as below.

Talc: Crown talc PP, manufactured by Matsumura Sangyo
Fine powder talc: HS-T0.5, manufactured by Hayasi Kasei Co.,
Mica: REPCOMICA M325CE, manufactured by Repco, Inc.
Koalin: HYDRITE FLAT D, manufactured by Dry Branch Kaolin
Graphite: HAG-15, manufactured by Nippon Kokuen
Wollastonite: NYAD325, manufactured by NYCO
Spherical silica: FB-74, manufactured by Denki Kagaku Kogyo
Titanium oxide: SR1, manufactured by Sakai Chemical
GF: glass fibers, chopped strand of 10 μm fiber diameter, 3 mm fiber length

TABLE 1

| | (A) LCP | Filler | | Pate flatness | | Warp of connector | | Measurement results of X-ray diffraction | |
|---|---|---|---|---|---|---|---|---|---|
| | (parts | (parts by weight) | | Injection | Warping | Injection | Warping | By Reflection | By Transmission |
| | by | (B) | (C) | speed | amount | speed | amount | method | method |
| | weight | Non-fibrous | Fibrous | (mm/sec) | (mm) | (mm/sec) | (mm) | Peaks of Filler | |
| Ex. 1 | 100 | Talc 50 | | 150 | 0.12 | 200 | 0.269 | presence | absence |
| Com. Ex. 1 | 100 | | GF 50 | 150 | 0.89 | 200 | 0.545 | absence | absence |
| Ex. 2 | 100 | Talc 60 | GF 20 | 150 | 0.10 | 200 | 0.230 | presence | absence |
| Ex. 3 | 100 | Talc 20 | GF 30 | 150 | 0.07 | 200 | 0.230 | presence | absence |
| Com. Ex. 2 | 100 | Talc 20 | GF 30 | 33 | 0.91 | 83 | 0.320 | presence | presence |

TABLE 1-continued

|  | (A) LCP (parts by weight) | Filler (parts by weight) | | Pate flatness | | Warp of connector | | Measurement results of X-ray diffraction | |
|---|---|---|---|---|---|---|---|---|---|
|  |  | (B) Non-fibrous | (C) Fibrous | Injection speed (mm/sec) | Warping amount (mm) | Injection speed (mm/sec) | Warping amount (mm) | By Reflection method | By Transmission method |
|  |  |  |  |  |  |  |  | Peaks of Filler | |
| Com. Ex. 3 | 100 | Talc 20 | GF 30 | 450 | 1.25 | 450 | 0.431 | presence | presence |
| Ex. 4 | 100 | Fine powder talc 20 | GF 30 | 150 | 0.18 | 200 | 0.220 | presence | absence |
| Ex. 5 | 100 | Mica 20 | GF 30 | 150 | 0.20 | 200 | 0.272 | presence | absence |
| Ex. 6 | 100 | Kaolin 20 | GF 30 | 150 | 0.25 | 200 | 0.270 | presence | absence |
| Com. Ex. 7 | 100 | Graphite 20 | GF 30 | 150 | 0.35 | 200 | 0.285 | presence | absence |
| Com. Ex. 4 | 100 | Wollastonite 20 | GF 30 | 150 | 0.95 | 200 | 0.319 | presence | present |
| Com. Ex. 5 | 100 | Spherical silica 20 | GF 30 | 150 | 12.13 | 200 | 0.360 | presence | present |
| Com. Ex. 6 | 100 | Titanium oxide 20 | GF 30 | 150 | 4.42 | 200 | 0.471 | presence | presence |

What is claimed is:

1. A molded article of a liquid crystal polymer composition in which 100 parts by weight of a liquid crystal polymer (A) and 5–100 parts by weight of a non-fibrous filler (B) are compounded where the non-fibrous filler is so dispersed that, when a diffraction peak of the non-fibrous filler is measured by a transmission method and a reflection method by means of a wide-angle X-ray diffraction, the diffraction peak of the non-fibrous filler which can be confirmed by the reflection method is not confirmed by the transmission method.

2. The molded article according to claim 1, wherein the non-fibrous filler (B) is a plate-shaped filler.

3. The molded article according to claim 2, wherein the plate-shaped filler comprises at least one member selected from talc, mica, kaolin and graphite.

4. The molded article according to claim 3, wherein a liquid crystal polymer composition where 5–100 parts by weight of a fibrous filler (C) having an average fiber diameter of 5–20 $\mu$m and an average aspect ratio of not less than 15 is further compounded to 100 parts by weight of the liquid crystal polymer (A).

5. The molded article according to claim 4, wherein a liquid crystal polymer composition where the liquid crystal polymer (A) is polyester amide.

6. The molded article according to claim 3, wherein a liquid crystal polymer composition where the liquid crystal polymer (A) is polyester amide.

7. The molded article according to claim 3, wherein the molded article is a connector.

8. The molded article according to claim 2, wherein a liquid crystal polymer composition where 5–100 parts by weight of a fibrous filler (C) having an average fiber diameter of 5–20 $\mu$m and an average aspect ratio of not less than 15 is further compounded to 100 parts by weight of the liquid crystal polymer (A).

9. The molded article according to claim 8, wherein a liquid crystal polymer composition where the liquid crystal polymer (A) is polyester amide.

10. The molded article according to claim 2, wherein the molded article is a connector.

11. The molded article according to claim 1, wherein a liquid crystal polymer composition where 5–100 parts by weight of a fibrous filler (C) having an average fiber diameter of 5–20 $\mu$m and an average aspect ratio of not less than 15 is further compounded to 100 parts by weight of the liquid crystal polymer (A).

12. The molded article according to claim 11, wherein the fibrous filer (C) comprises glass fiber.

13. The molded article according to claim 12, wherein a liquid crystal polymer composition where the liquid crystal polymer (A) is polyester amide.

14. The molded article according to claim 12, wherein the molded article is a connector.

15. The molded article according to claim 11, wherein a liquid crystal polymer composition where the liquid crystal polymer (A) is polyester amide.

16. The molded article according to claim 11, wherein the molded article is a connector.

17. The molded article according to claim 1, wherein a liquid crystal polymer composition where the liquid crystal polymer (A) is polyester amide.

18. The molded article according to claim 17, wherein the molded article is a connector.

19. The molded article according to claim 1, wherein the molded article is a connector.

20. The molded article according to claim 1, wherein a liquid crystal polymer composition where the liquid crystal polymer (A) is polyester amide.

* * * * *